(12) United States Patent
von Dadelszen et al.

(10) Patent No.: US 9,851,570 B2
(45) Date of Patent: Dec. 26, 2017

(54) BEAM SHAPING OF HIGH INTENSITY HIGH FREQUENCY OPTICAL OUTPUT

(71) Applicant: IPG Photonics Corporation, Oxford, MA (US)

(72) Inventors: Michael von Dadelszen, Merrimack, NH (US); Jeffery D. Kmetec, Palo Alto, CA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 15/459,323

(22) Filed: Mar. 15, 2017

(65) Prior Publication Data
US 2017/0184864 A1    Jun. 29, 2017

Related U.S. Application Data

(63) Continuation of application No. PCT/US2015/005772, filed on Sep. 17, 2015.

(60) Provisional application No. 62/052,350, filed on Sep. 18, 2014.

(51) Int. Cl.
  *G02B 27/09* (2006.01)
  *G02F 1/35* (2006.01)
  *G02B 1/02* (2006.01)

(52) U.S. Cl.
  CPC .............. *G02B 27/095* (2013.01); *G02B 1/02* (2013.01); *G02B 27/0916* (2013.01); *G02F 1/3501* (2013.01); *G02F 2001/3509* (2013.01)

(58) Field of Classification Search
  CPC .... G02B 6/32; G02B 27/0916; G02B 27/095; G02F 1/3501; G02F 2001/3509
  See application file for complete search history.

(56) References Cited

U.S. PATENT DOCUMENTS

| | | | | |
|---|---|---|---|---|
| 5,013,133 | A | * | 5/1991 | Buralli ................ G02B 3/00 359/558 |
| 5,796,761 | A | | 8/1998 | Injeyan et al. |
| 5,818,632 | A | | 10/1998 | Stephenson |
| 6,097,555 | A | | 8/2000 | Lehmann et al. |
| 7,330,300 | B1 | * | 2/2008 | Yu ..................... G02F 1/3534 359/326 |
| 8,279,521 | B2 | | 10/2012 | Kubo et al. |

(Continued)

OTHER PUBLICATIONS

International Search Report and Written Opinion dated Dec. 22, 2015 for International Patent Application No. PCT/US2015/050772.

*Primary Examiner* — Daniel Petkovsek
(74) *Attorney, Agent, or Firm* — JDI Patent; Joshua Isenberg

(57) ABSTRACT

An optical output coupler includes an uncoated plano-concave lens having a planar side and a concave side. An optical axis of the plano-concave lens is tilted at or near a Brewster angle relative to a beam axis. A first optical element is configured to focus a beam of radiation emerging from the planar side of the plano-concave lens along a first axis that is perpendicular to the beam axis. The first optical element is disposed between the planar side of the plano-concave lens and a second optical element. The second optical element is configured to focus a beam of radiation emerging from the planar side of the plano-concave lens along a second axis that is perpendicular to the beam axis, wherein the second axis is different from the first axis.

52 Claims, 2 Drawing Sheets

(56) References Cited

U.S. PATENT DOCUMENTS

| | | |
|---|---|---|
| 8,456,734 B2 * | 6/2013 | Horikawa ............ H01S 3/09415 359/328 |
| 2002/0011437 A1 | 1/2002 | Kaito et al. |
| 2003/0210730 A1 | 11/2003 | Tomaru et al. |
| 2005/0270652 A1 | 12/2005 | Voss et al. |
| 2006/0083284 A1 | 4/2006 | Paldus et al. |
| 2007/0119836 A1 | 5/2007 | Schroeder |
| 2008/0130007 A1 | 6/2008 | O'Connell |
| 2010/0296153 A1 | 11/2010 | Jungbluth et al. |
| 2013/0156054 A1 | 6/2013 | Danekar et al. |

* cited by examiner

BEAM SHAPING OF HIGH INTENSITY HIGH FREQUENCY OPTICAL OUTPUT

CLAIM OF PRIORITY

This Application is a continuation of International Patent Application Number PCT/US2015/050772, filed Sep. 17, 2015, the entire contents of which are incorporated herein by reference. International Patent Application Number PCT/US2015/050772 claims the priority benefit of commonly assigned U.S. Provisional Patent Application No. 62/052,350, filed Sep. 18, 2014, the entire contents of which are incorporated by reference herein.

FIELD OF THE INVENTION

Aspects of the present disclosure relate to optical frequency conversion and more specifically to beam shaping for the output of an optical frequency conversion system.

BACKGROUND OF THE INVENTION

High-powered optical sources have many applications in which an intense beam of light is focused onto a substrate or other target. Many high power optical systems make use of wavelength conversion to produce light having a desired wavelength or range of wavelengths. Often the process of conversion involves performing some non-linear optical wavelength conversion on input light from a source, such as a laser. The wavelengths that can be produced by nonlinear optical wavelength conversion are limited however by the wavelengths that can be produced with available lasers and the nonlinear optical wavelength conversion processes. For example, many wavelength-converted laser systems are based on a seed laser that produces light at a fundamental vacuum wavelength of 1064 nanometers. The infrared 1064 nm light can be converted to 532 nm visible light by nonlinear frequency doubling. The 523 nm visible light can be converted to 266 nm ultraviolet light in a subsequent nonlinear frequency doubling process.

Optical frequency conversion often requires high peak input intensity (power per unit area) in order to obtain efficient optical frequency conversion. As a result, the output beam is often a narrow, high power beam. It is often desired to expand or otherwise shape the narrow output beam. However, high intensity, high frequency output beams present challenges for beam shaping. Beam shaping is typically done with mirrors, lenses, or other optical components that expand the beam diameter and/or convert an elliptical beam to a round beam. One of the challenges is to reduce reflections of the output beam from the surfaces of the optical elements used for beam shaping. One conventional approach to reducing reflections is to coat the surfaces of the optical elements with an anti-reflection (AR) coating. Unfortunately, such coatings are susceptible to damage from high intensity, high frequency light.

It is within this context that embodiments of the present invention arise.

DESCRIPTION OF THE SPECIFIC EMBODIMENTS

Figure 1A:
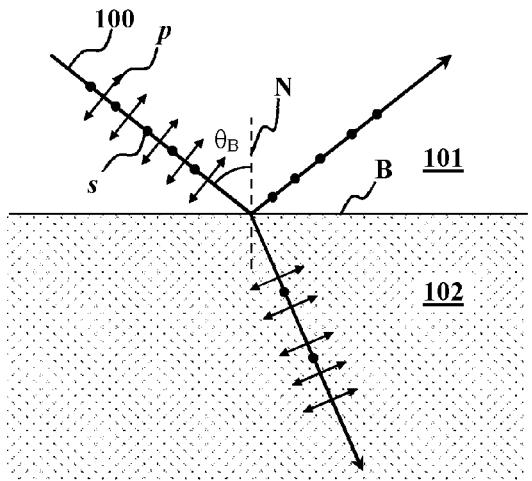
FIGS. 1A-1B is a cross-sectional schematic diagram illustrating the concept of Brewster's angle as it applies to certain aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Glossary

As used herein, the following terms have the following meanings:

Cavity or Optically Resonant Cavity refers to an optical path defined by two or more reflecting surfaces along which light can reciprocate or circulate. Objects that intersect the optical path are said to be within the cavity.

Continuous wave (CW) laser refers to a laser that emits radiation continuously rather than in short bursts, as in a pulsed laser.

Duty Cycle (D) refers to the product of the pulse duration τ and the pulse repetition frequency (PRF) for pulses that occur at regular intervals. The duty cycle may be expressed as a ratio, for example, 0.01 or equivalently may be expressed as a percentage, for example 1%.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain refers to an increase in intensity, power, or pulse energy of a signal that is transmitted from one point to another through an amplifier. The term "unsaturated gain" refers to the increase of a small signal passing through the amplifier, which does not significantly change the inversion level in the amplifier. As used herein gain and unsaturated gain will be used interchangeably.

Gain Medium refers to a material capable of generating optical gain as described below with respect to a Laser.

Infrared Radiation refers to electromagnetic radiation characterized by a vacuum wavelength between about 700 nanometers (nm) and about 100,000 nm.

Laser is an acronym for light amplification by stimulated emission of radiation. A laser is a cavity that contains a lasable material, or gain medium. This is any material—crystal, glass, liquid, semiconductor, dye or gas—the atoms of which are capable of emitting light when pumped, e.g., by other light or an electric discharge. The light emission is stimulated by the presence by a passing photon, which causes the emitted photon to have approximately the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Nonlinear Optical Wavelength Conversion Processes are non-linear optical processes whereby input light of a given vacuum wavelength $\lambda_0$ passing through a non-linear medium interacts with the medium and/or other light passing through the medium in a way that produces output light having a different vacuum wavelength than the input light. Nonlinear wavelength conversion is equivalent to nonlinear frequency conversion, since wavelength and frequency are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light of frequency $f_0$ interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Non-linear material refers to materials that possess a non-zero nonlinear dielectric response to optical radiation that can give rise to non-linear effects. Examples of non-linear materials include crystals of lithium niobate ($LiNbO_3$), lithium triborate (LBO), beta-barium borate (BBO), Cesium Lithium Borate (CLBO), KDP and its isomorphs, $LiIO_3$, as well as quasi-phase-matched materials, e.g., PPLN, PPSLT, PPKTP and the like.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-matching refers to the technique used in a multi-wave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Pulse Duration ($\tau$) refers to the temporal duration or lifetime of a repetitive signal, e.g., the time interval between the half-power points on the leading and trailing edges of the pulse. Pulse duration is sometimes referred to as "pulse width".

Pulse Energy refers to the amount of energy in a pulse. Pulse energy may be calculated by integrating instantaneous pulse power over the pulse duration.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Q refers to the figure of merit of a resonator (cavity), defined as ($2\pi$)×(average energy stored in the resonator)/(energy dissipated per cycle). The higher the reflectivity of the surfaces of an optical resonator and the lower the absorption losses, the higher the Q and the less energy loss from the desired mode.

Quasi-CW refers to generating a succession of pulses at a high enough repetition rate to appear continuous.

Quasi Phase-matched (QPM) Material: In a quasi-phase-matched material, the fundamental and higher harmonic radiation are approximately phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Raman Scattering refers to a scattering of incident light by matter in which the scattered light has a lower frequency than the incident light. The difference between the frequencies of the incident and scattered light (referred to as the Raman shift) corresponds to a natural vibrational frequency of the scattering material.

Saturation of an optical amplifier refers to a decrease of the gain coefficient of a medium near some transition frequency when the power of the incident radiation near that frequency exceeds a certain value. If the gain coefficient is constant, the power emitted by the medium is proportional to the incident power. However, there is typically a limit to the rate at which a gain medium can emit power. This limit depends on the lifetimes of the energy levels involved. As this limit is reached, the stimulated transitions become rapid enough to significantly lower the upper energy level population, thereby decreasing the gain coefficient. The effect is to "flatten" the amplified power as a function of input power.

Stimulated Raman Scattering (SRS) is a type of Raman scattering that can occur with an intense optical beam. The Raman-scattered light experiences gain and its power increases exponentially. If the power of the incident light exceeds a threshold value, a large portion of the incident light is converted to Raman-scattered light having a lower frequency than the incident light. SRS is also sometimes known as the stimulated Raman effect or coherent Raman effect.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Vacuum Wavelength: The wavelength of electromagnetic radiation is generally a function of the medium in which the wave travels. The vacuum wavelength is the wavelength that electromagnetic radiation of a given frequency would have if the radiation were propagating through a vacuum and is given by the speed of light in vacuum divided by the frequency.

Introduction

According to aspects of the present disclosure an optical output coupler may utilize a plano-concave lens tilted at or near (e.g., within about 1° of) a Brewster angle for high intensity, high frequency (e.g., 266-nm) p-polarized light. As long as the concave surface radius is much larger than the beam size, the surface angle the beam sees is effectively constant across its diameter. This way the output coupler can use an uncoated optic with minimal losses to start expanding the beam. High quality bulk fused silica (or maybe CaF2) should stand up well to the high intensity. Two crossed cylindrical lenses can collimate the beam with minimum ellipticity at a desired radius. The beam is much larger in diameter at these lenses, and there is much less concern about coating damage.

Figure 1B:
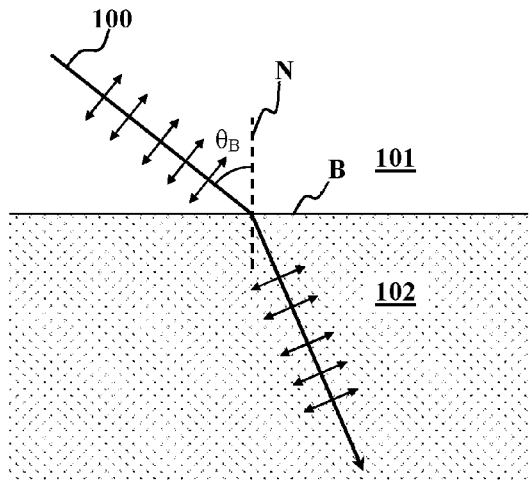

FIG. 1A and FIG. 1B illustrate the concept of Brewster's angle within the context of the present disclosure. As seen in FIG. 1A, when incoming light 100 encounters a boundary B between two media 101, 102 with different refractive indices $n_1$ and $n_2$, respectively, some of the light is usually reflected. According to the Fresnel equations, the fraction that is reflected depends on the incoming light's polarization and angle of incidence. Generally, unpolarized light can be thought of as being comprised of two different polarizations. Light polarized in the incident plane (the same plane as the incident ray and the surface normal N) is said to be p-polarized light p. Light polarized perpendicular to the incident plane is said to be s-polarized light s. The Fresnel equations predict that p-polarized light travelling from a first medium of refractive index $n_1$ to a second medium of refractive index $n_2$ will not be reflected if the angle of incidence is:

$$\theta_B = \arctan\left(\frac{n_2}{n_2}\right)$$

Only the s-polarized light is reflected for this incident angle. The angle $\theta_B$ is known as Brewster's angle is conventionally measured with respect to the normal N of the boundary B. As may be seen in FIG. 1B, if the incident light 100 is p-polarized, essentially none of the incident light is reflected at the boundary B and all of it is transmitted into the second medium 102.

The principle of Brewster's angle can be applied to an optical output coupler for a wavelength converted optical system in accordance with aspects of the present disclosure. Wavelength conversion systems typically produce a narrow beam of polarized optical output. By orienting the first optical element of an output coupler at Brewster's angle relative to a polarized output beam, the first optical element can be made essentially non-reflecting without having to AR coat it.

Figure 2A:
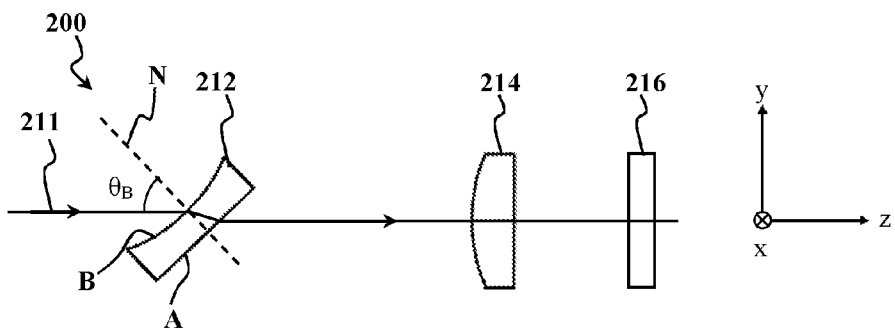
FIG. 2A is a cross-sectional schematic diagram illustrating an optical output coupler according to an aspect of the present disclosure.

FIG. 2A illustrates an example of an optical output coupler 200 for a wavelength converted optical system in accordance with aspects of the present disclosure. The optical output coupler 200 generally includes a plano-concave lens 212 optically coupled to first and second optical elements 214, 216, which may be implemented, e.g., as cylindrical lenses. The plano-concave lens 212 has a planar side A and a concave side B.

Both sides may be uncoated. The plano-concave lens can be made of a suitable optical grade material such as fused silica or calcium difluoride ($CaF_2$). A radius of curvature of the concave side B of the plano-concave lens 212 may be between about 5 mm and about 25 mm. A distance from the plano concave lens 212 to the second cylindrical lens 216 along the beam axis is between about 75 mm and about 250 mm. It is noted that in FIG. 2A, the beam axis is shown as straight. However, aspects of the present disclosure include implementations in which the axis is bent, e.g., using prisms or mirrors to deflect the light as it travels through the output coupler 200. The direction of the beam axis at a particular location in the output coupler may therefore be regarded as the direction of a central ray of light in the beam at that location.

The first cylindrical lens 214 is disposed between the planar side A of the plano-concave lens and the second cylindrical lens 216. An optical axis N of the plano-concave lens 212 is tilted at a Brewster angle $\theta_B$ relative to an axis of an input beam 211, which is incident on the concave side B of the plano-concave lens. The plano-concave lens may be configured to diverge an approximately parallel input beam 211 incident on the concave side B such that a diameter of the beam of radiation increases to between about 250% and about 2500% of the diameter at the concave side.

Prisms, either singly or in combination, are frequently used to compensate for astigmatism of frequency converted beams. Aspects of the present disclosure are therefore equally applicable to configurations that use a combination of optical elements including prism(s) in conjunction with, or in lieu of, either or both the cylindrical lenses as the optical elements 214 and 216. The prism(s) may be used in conjunction with a spherical lens, to achieve the same results as the cylindrical lenses of FIG. 2 and FIG. 3.

The first optical element 214 is configured to collimate a beam of radiation emerging from the planar side of the plano-concave lens along a first axis that is perpendicular to the beam axis. An optical axis of the first optical element 214 may be aligned substantially parallel to the beam axis. An optical axis of the second optical element 216 may be aligned substantially parallel to the beam axis. Some small adjustment may be used for fine-tuning of beam astigmatism As used herein, the term "substantially parallel" means parallel to within about ±5 degrees.

The second optical element 216 is configured to collimate a beam of radiation emerging from the planar side A of the plano-concave lens along a second axis that is perpendicular to the beam axis. The second axis is different from the first axis. By way of example, the first axis may be the y-axis and the second axis may be the x-axis, as shown in FIG. 2A. The first and second axes need not necessarily be perpendicular to each other.

For the reasons discussed above with respect to FIG. 1B, the plano-concave lens can be made effectively non-reflecting if the input beam is p-polarized, i.e., polarized along the y-axis in the example illustrated in FIG. 2A. This avoids the need for an AR coating in the concave side B. The plano-concave lens 212 is therefore less susceptible to damage resulting from a high-intensity high frequency input beam 211, e.g., a beam of ultraviolet light. Expansion of the beam between the plano-concave lens 212 and the first cylindrical lens reduces the intensity of the input beam 211. The optical surfaces of the cylindrical lenses 214, 216 may be AR coated. If the beam diameter expands sufficiently, AR coatings on the optical elements 214, 216 can withstand the beam without significant damage.

As a numerical example, the input beam 211 may be an elliptical beam of ultraviolet radiation of vacuum from the crystal (250 μm×350 μm) with a peak irradiance of $1.5 \times 10^4$ Watts/mm$^2$. Using a Brewster-angled plano-concave lens 212 made of fused silica of focal length −16 mm and cylindrical lenses 214, 216 of focal lengths 36.5 mm and 34 mm, respectively such an input beam may collimated to a circular a 2-mm diameter circular beam with a peak irradiance of about 3.1 Watts/mm$^2$.

The plano-concave lens 212, when used at an angle, has different focal lengths in the tangential and sagittal axes: $f*\cos(\theta)$ for tangential, and $f/\cos(\theta)$ for sagittal, where f is the nominal, normal incidence focal length, and $\theta$, in this case, is the Brewster angle $\theta_B$, or nearly the Brewster, angle. For example, if the lens 212 has a refractive index=1.5, then $\theta=56.3$ degrees, $\cos(\theta)=0.555$. The effective tangential focal length is reduced to approximately 56% of its normal incidence value and the effective sagittal focal length is increased to approximately 180% of its normal incidence value. For the previously mentioned focal length of −16 mm, the tangential and sagittal focal lengths become approximately −8.9 mm and approximately −29 mm, respectively.

Depending on the astigmatism characteristics (e.g. waist diameter and divergence for each axis) of the input beam 211 it is possible to select optimum lens focal length combinations for the output coupler 200 such that a collimated, nearly circular exit beam will be generated. There is a trade-off between compactness and aberrations. As the focal length of the plano-concave lens 212 is reduced, the beam shaping section 200 is equivalently reduced in length. However, the f/# will also be reduced, with a requisite increase in aberrations. The aberrations will further be increased by the reduced effective tangential focal length in that axis. The optimum parameter selections will depend on both the characteristics of the input beam 211 and the acceptable output beam quality. For the preceding example (250 μm×350 μm input beam waist 211, −16 mm plano-concave lens 212, 36.5 mm cylindrical lens 214 and 34 mm cylindrical lens 216) the induced tangential RMS wavefront error is significantly less than 0.1 waves, which would be considered diffraction limited for most applications.

Figure 2B:
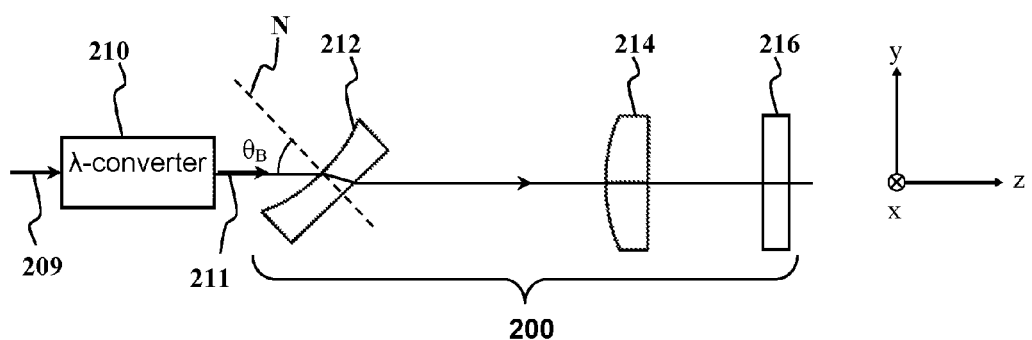
FIG. 2B is a cross-sectional schematic diagram illustrating an optical wavelength converter according to an aspect of the present disclosure.

FIG. 2B illustrates a wavelength converter system that utilizes the output coupler shown in FIG. 2A. The wavelength converter system includes a wavelength converter 210 optically coupled to the output coupler 200. The optical wavelength converter is configured to generate a wavelength converted output beam of radiation 211 from an input beam of radiation 209. The optical output coupler is configured to receive the wavelength converted output beam of radiation 211 as its input. The output coupler 200 is configured as described above with respect to FIG. 2A.

The optical source 301, optical wavelength converter 210 and output coupler 200 may be configured such that the wavelength converted output beam of radiation has a substantially elliptical cross-section having a major diameter between about 0.15 mm and about 0.5 mm and a minor diameter between about 0.2 mm and about WW 0.6 mm. The plano-concave lens in the output coupler may be configured to diverge an approximately parallel beam of radiation 211 incident on the concave side B such that a diameter of the beam of radiation increases to between about 1.0 mm and about 5.0 mm at the first cylindrical lens 214. Depending on the irradiance of the beam 211, the expansion should be sufficient that the beam irradiance is low enough at the optical surfaces of the cylindrical lenses 214, 216 to avoid any damage to AR coatings on them.

By way of example, and not by way of limitation, the wavelength converter 210 may implement a nonlinear optical wavelength conversion process, as discussed above. By way of more specific example, the wavelength converter may include a non-linear optical crystal that is configured to produce output radiation 211 having a vacuum wavelength in the ultraviolet range of the electromagnetic spectrum. For example, the non-linear crystal may be configured to implement second harmonic generation on a visible-wavelength input beam 209 (e.g., having a vacuum wavelength of 532 nm) to produce an ultraviolet output radiation 211 (e.g., having a vacuum wavelength of 266 nm).

In alternative implementations, the wavelength converter 210 may include two different nonlinear crystals. As a first example, a first nonlinear crystal may be configured to convert infrared input radiation (e.g., having a vacuum wavelength of 1064 nm) to visible radiation (e.g., having a vacuum wavelength of 532 nm) by way of second harmonic generation. A second nonlinear crystal may be configured to convert the visible radiation to ultraviolet radiation by way of second harmonic generation. As a second example, the wavelength converter 210 may include a first nonlinear crystal configured to generate a frequency-tripled intermediate output from an infrared input by third harmonic generation and a second nonlinear crystal configured implement sum-frequency generation on a leftover portion of the infrared input and the frequency-tripled intermediate output to generate a final output having a frequency four times that of the infrared input radiation.

The best technique for producing a frequency four times that of the infrared input radiation depends on the specific requirements and cost/complexity constraints. Parameters such as pulse energy, repetition rate and pulse duration, in combination with desired cost and lifetime goals will determine whether second harmonic generation of a visible wavelength beam via use of a single crystal or whether a sum frequency generation technique is preferred.

The wavelength converter system shown in FIG. 2B may be further optimized, e.g., by separating out unconverted input radiation 209 from the output beam 211 and/or by adding an energy monitor.

Figure 3:
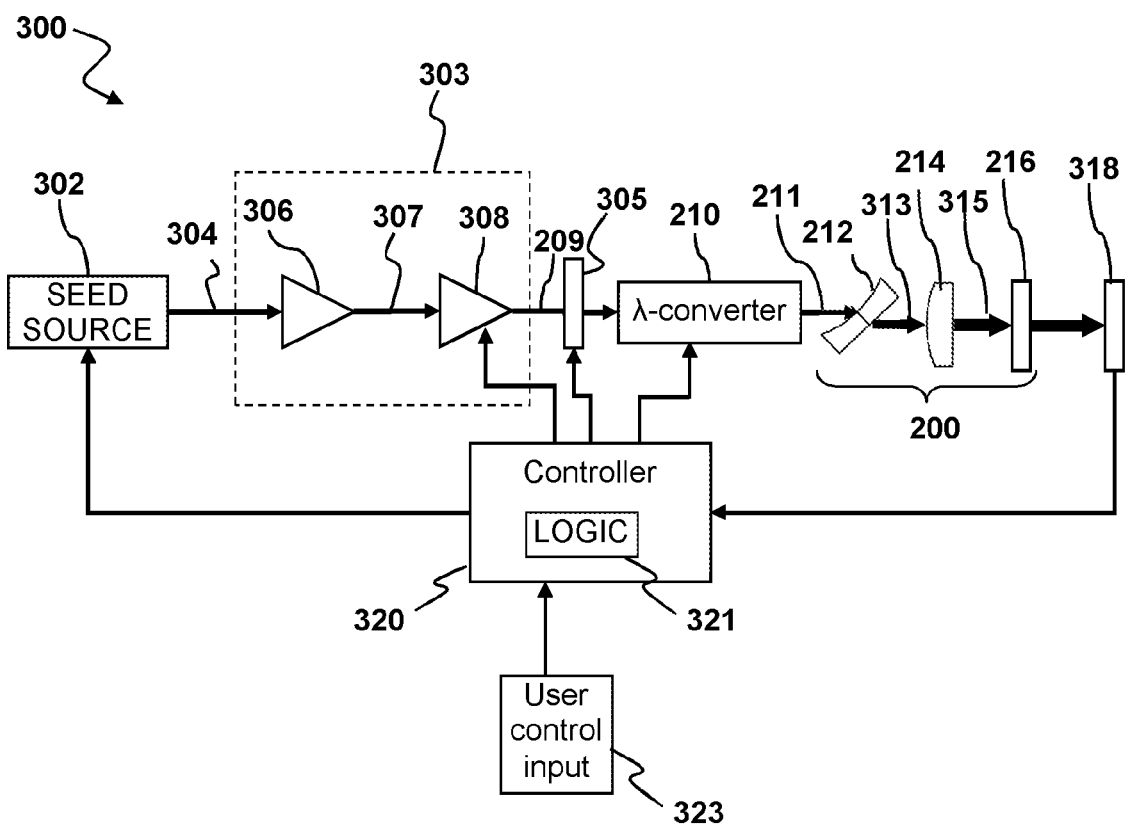
FIG. 3 is a schematic diagram illustrating a wavelength-converted optical source according to an aspect of the present disclosure.

FIG. 3 depicts an optical system 300 according to an aspect of the present disclosure. The system 300 generally includes an optical source 301, a wavelength converter 210, and an output coupler 200 of the type described above. By way of example, and not by way of limitation, the optical source 301 may include a seed source 302, one or more optional optical amplifiers 306, and a power amplifier 308. In such an example, the seed source 302 generates an optical seed signal 304, which is optically coupled to the optional preamplifier 306.

The seed source 302 may be any of the representative laser types of semiconductor seed sources, such as distributed feedback laser (DFB), distributed Bragg reflector laser (DBR), Fabry-Perot laser (FP), external cavity diode laser, vertical cavity semiconductor laser (VCSEL), vertical extended cavity semiconductor laser (VECSEL), or amplified stimulated emission source (ASE).

The seed signal 304 may be amplified by the pre-amplifier 306 to generate a pre-amplified signal 307 which is further amplified in the power amplifier 308 to produce an amplified output that serves as an input 209 for the wavelength converter 210. By way of example, the optical amplifier 308 may be a fiber amplifier. Examples of fiber amplifiers are described, e.g., in U.S. Pat. No. 7,529,281, the entire contents of which are incorporated herein by reference. In particular, FIG. 3 of U.S. Pat. No. 7,529,281 and the associated discussion describe an example of a fiber amplifier.

As is well known in the art, bandpass filters, optical switches, and optical isolators can be placed between the amplifier stages to prevent backward propagating beams and minimize the effects of unseeded spontaneous emission.

The amplified output from the optical power amplifier 308 may be optically coupled to the optional wavelength converter 210. The wavelength converter 210 converts at least a portion of the input 209 to produce a wavelength converted output 211 characterized by a different optical frequency than the amplified output 209. The wavelength converter 210 may implement a nonlinear optical wavelength conversion process, as discussed above. In some embodiments, the system 300 may include coupling optics 305 that receive the amplified output 209 from the optical amplifier 308 and transmit it to the wavelength converter 210. In some embodiments the wavelength converter 210 may not be required.

In general, the source of optical radiation and optical wavelength converter are configured such that the wavelength converted output beam of radiation has a substantially elliptical cross-section having a major diameter between about 0.2 mm and about 0.6 mm and a minor diameter between about 0.15 mm and about 0.5 mm.

The controller 320 may be operably coupled to the seed source 302 and/or optional optical preamplifier 306, power amplifier 308, and/or wavelength converter 210 to control the power or intensity of the wavelength-converted output 211 in response to user control inputs 323. By way of example, in some embodiments, the system controller 320 may include hardware or software configured to implement programmable logic 321. Such logic may cause the controller to operate in response to one or more feedback signals. For example, from a portion of the output 211 may be deflected, e.g., by a beamsplitter to a power monitor 318 and this signal may be used as part of a feedback loop.

The final output 211 may be delivered to any of a number of different types of targets to implement any of a number of different types of processes depending on the application. Applications include, but are not limited to, material processing, medical treatments, laser particle accelerators, and wafer inspection. Examples of suitable targets include, but are not limited to, metals, ceramics, semiconductors, polymers, composites, thin films, organic materials, in vitro or in vivo biological samples, and elementary particles. In the particular case of material processing, targets may include, e.g., wires, printed circuit (PC) boards, integrated circuit (IC) packages, IC wafers dies, LED wafers, packages, dies and the like. Examples of material processing applications include surface texturing, heat treatment, surface engraving, fine micro-machining, surface ablation, cutting, grooving, bump forming, coating, soldering, brazing, sintering, sealing, welding, link blowing, wafer scribing, dicing and marking, via drilling, memory repair, flat panel display repair, stereolithography, maskless lithography, surface diffusion and surface conversion to a compound.

Pulsed operation of the system shown in FIG. 3 may be implemented in many applications because it allows power stored in a power amplifier 308 to be released in short pulses. A simplest type of pulsed operation is continuous pulse train with the power amplifier 308 being pumped at a constant pump rate. To first order, peak fundamental output power is increased by factor of 1/DC, where DC is the pulse duty cycle. Duty cycle may be in the range from 0.01 to 0.00001. Peak power in amplified output 309 is 100 to 100,000 times the output of power amplifier operating in a continuous wave (cw) condition. Such high peak powers are one reason among many to avoid anti-reflection coatings on optical surfaces that are exposed to the wavelength-converted output beam 211.

According to aspects of the present disclosure, high-power high-frequency optical outputs can be collimated while reducing the likelihood of damage to optical surfaces.

Several variations on the aspects described above are within the scope of the present disclosure. For example, if the confocal parameter is less than the length of a nonlinear optical material used as the wavelength converter 210, then polishing curvature on the Brewster exit face of the nonlinear optical crystal would avoid the need for a separate angled lens 212. The functions of the wavelength converter 210 and angled lens 212 could be combined into a single element. Alternatively, the angled lens 212 may be made from a non-linear optical material (e.g., LBO) that has a higher damage threshold than fused silica or calcium difluoride or other materials mentioned above. More generally, the material of the angled lens 212 may be selected primarily for its damage threshold properties, including materials not normally used in lenses, due to other poor properties (e.g., CLBO).

While the above is a complete description of the preferred embodiment of the present invention, it is possible to use various alternatives, modifications and equivalents. Therefore, the scope of the present invention should be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:
1. A optical output coupler, comprising:
a plano-concave lens having a planar side and a concave side, wherein an optical axis of the plano-concave lens is tilted about an axis of curvature of the plano-concave lens or an axis parallel to the axis of curvature at or near a Brewster angle relative to a beam axis such that a beam of radiation is incident on a concave side of the plano-concave lens;
a first optical element configured to focus a beam of radiation emerging from the planar side of the plano-concave lens along a first axis that is perpendicular to the beam axis; and
a second optical element, wherein the first optical element is disposed between the planar side of the plano-concave lens and the second optical element, wherein the second optical element is configured to focus a beam of radiation emerging from the planar side of the plano-concave lens along a second axis that is perpendicular to the beam axis, wherein the second axis is different from the first axis.
2. The optical output coupler of claim 1, wherein the plano-concave lens is made of fused silica.
3. The optical output coupler of claim 1, wherein the plano-concave lens is made of calcium difluoride ($CaF_2$).

4. The optical output coupler of claim 1, wherein the first axis is perpendicular to the second axis.

5. The output coupler of claim 1, wherein an optical axis of the first optical element is aligned substantially parallel to the beam axis.

6. The output coupler of claim 1, wherein an optical axis of the second optical element is aligned substantially parallel to the beam axis.

7. The output coupler of claim 1, wherein an optical axis of the first optical element is aligned substantially parallel to the beam axis and an optical axis of the second optical element is aligned substantially parallel to the beam axis.

8. The output coupler of claim 1, wherein one or more surfaces of the first optical element are coated with an anti-reflection coating.

9. The output coupler of claim 1, wherein one or more surfaces of the second optical element are coated with an anti-reflection coating.

10. The output coupler of claim 1, wherein one or more surfaces of the first optical element are coated with an anti-reflection coating and wherein one or more surfaces of the second optical element are coated with an anti-reflection coating.

11. The output coupler of claim 1, wherein the plano-concave lens is configured to diverge an approximately parallel beam of radiation incident on the concave side such that a diameter of the approximately parallel beam of radiation increases to between about 250% and about 2500% of the diameter of the approximately parallel beam of radiation at the concave side of the plano-concave lens.

12. The output coupler of claim 1, wherein a radius of curvature of the concave side of the plano-concave lens is between about 5 mm about 25 mm.

13. The output coupler of claim 1, wherein the plano-concave lens, first optical element and second optical element are configured to collimate an elliptical radiation beam incident on the planar side of the plano-concave lens into a circular beam of radiation.

14. The output coupler of claim 1, wherein a distance from the plano concave lens to the second cylindrical lens along the beam axis is between about 75 mm and about 250 mm.

15. The output coupler of claim 1, wherein the plano-concave lens is made from a nonlinear optical material.

16. The output coupler of claim 1, wherein the plano-concave lens is made from a non-linear optical material having a higher threshold for damage from light than fused silica or calcium difluoride.

17. The output coupler of claim 1, wherein the first optical element includes a cylindrical lens.

18. The output coupler of claim 1, wherein the second optical element includes a cylindrical lens.

19. The output coupler of claim 1, wherein the first optical element includes a first cylindrical lens and the second optical element is a second cylindrical lens.

20. The output coupler of claim 1, wherein the first optical element includes a prism.

21. The output coupler of claim 1, wherein the second optical element includes a prism.

22. The output coupler of claim 1, wherein the first optical element includes a first prism and the second optical element includes a second prism.

23. The output coupler of claim 1, wherein the first optical element or the second optical element includes a prism and a spherical lens.

24. The output coupler of claim 1, wherein plano-concave lens is characterized by curvature in two dimensions and negative focal lengths with respect to two orthogonal axes, wherein tilt of the plano-concave lens about the axis of curvature or the axis parallel to the axis of curvature changes focal lengths for the tangential and sagittal axes of the plano-concave lens.

25. A wavelength converter system comprising:
an optical wavelength converter configured to generate a wavelength converted output beam of radiation from an input beam of radiation; and
an optical output coupler configured to receive the wavelength converted output beam of radiation, wherein the optical output coupler includes a plano-concave lens having a planar side and a concave side, wherein an optical axis of the plano-concave lens is tilted about an axis of curvature of the plano-concave lens or an axis parallel to the axis of curvature at or near a Brewster angle relative to a beam axis such that a beam of radiation is incident on a concave side of the plano-concave lens;
a first optical element configured to focus a beam of radiation emerging from the planar side of the plano-concave lens along a first axis that is perpendicular to the beam axis; and a second optical element, wherein the first optical element is disposed between the planar side of the plano-concave lens and the second optical element, wherein the second optical element is configured to focus a beam of radiation emerging from the planar side of the plano-concave lens along a second axis that is perpendicular to the beam axis, wherein the second axis is different from the first axis.

26. The system of claim 25, wherein the wavelength converter includes a nonlinear optical material.

27. The system of claim 25, wherein the wavelength converter is configured to generate the wavelength converted output beam of radiation such that an optical frequency of the output beam is greater than an optical frequency of the input beam.

28. The system of claim 25, wherein the plano-concave lens is made from a nonlinear optical material.

29. The system of claim 25, wherein the wavelength converter is a nonlinear optical crystal having Brewster angle or near Brewster angle output face that is concave curved and acts as the plano-concave lens.

30. The system of claim 29, wherein a confocal parameter of the output coupler is less than a length of a nonlinear optical crystal, whereby functions of the wavelength converter and plano-concave lens are combined into a single element.

31. The system of claim 25, wherein the plano-concave lens is made from a non-linear optical material having a higher threshold for damage from light than fused silica or calcium difluoride.

32. The system of claim 25, wherein the first optical element includes a cylindrical lens.

33. The system of claim 25, wherein the second optical element includes a cylindrical lens.

34. The system of claim 25, wherein the first optical element includes a first cylindrical lens and the second optical element is a second cylindrical lens.

35. The system of claim 25, wherein the first optical element includes a prism.

36. The system of claim 25, wherein the second optical element includes a prism.

37. The system of claim 25, wherein the first optical element includes a first prism and the second optical element includes a second prism.

38. The system of claim 25, wherein the first optical element or the second optical element includes a prism and a spherical lens.

39. A wavelength-converted optical source, comprising:
a source of optical radiation;
an optical wavelength converter optically coupled to the source of optical radiation, wherein the optical wavelength converter is configured to generate a wavelength converted output beam of radiation from an input beam of radiation; and
an optical output coupler configured to receive the wavelength converted output beam of radiation, wherein the optical output coupler includes a plano-concave lens having a planar side and a concave side, wherein an optical axis of the plano-concave lens is tilted about an axis of curvature of the plano-concave lens or an axis parallel to the axis of curvature at or near a Brewster angle relative to a beam axis such that a beam of radiation is incident on a concave side of the plano-concave lens;
a first optical element configured to focus a beam of radiation emerging from the planar side of the plano-concave lens along a first axis that is perpendicular to the beam axis; and a second optical element, wherein the first optical element is disposed between the planar side of the plano-concave lens and the second optical element, wherein the second optical element is configured to focus a beam of radiation emerging from the planar side of the plano-concave lens along a second axis that is perpendicular to the beam axis, wherein the second axis is different from the first axis.

40. The wavelength-converted optical source of claim 39, wherein the source of optical radiation and optical wavelength converter are configured such that the wavelength converted output beam of radiation includes ultraviolet radiation.

41. The wavelength-converted optical source of claim 39, wherein the source of optical radiation and optical wavelength converter are configured such that the wavelength converted output beam of radiation has a substantially elliptical cross-section having a major diameter between about 0.2 mm and about 0.6 mm and a minor diameter between about 0.15 mm and about 0.5 mm.

42. The wavelength-converted optical source of claim 41, wherein the plano-concave lens is configured to diverge an approximately parallel beam of radiation incident on the concave side such that a diameter of the approximately parallel beam of radiation increases to between about 1 mm and about 5 mm.

43. The wavelength-converted optical source of claim 39, wherein the wavelength converter is a nonlinear optical crystal having Brewster angle or near Brewster angle output face that is concave curved and acts as the plano-concave lens.

44. The wavelength-converted optical source of claim 43, wherein a confocal parameter of the output coupler is less than a length of a nonlinear optical crystal, whereby functions of the wavelength converter and plano-concave lens are combined into a single element.

45. The wavelength-converted optical source of claim 39, wherein the plano-concave lens is made from a non-linear optical material having a higher threshold for damage from light than fused silica or calcium difluoride.

46. The wavelength-converted optical source of claim 39, wherein the first optical element includes a cylindrical lens.

47. The wavelength-converted optical source of claim 39, wherein the second optical element includes a cylindrical lens.

48. The wavelength-converted optical source of claim 39, wherein the first optical element includes a first cylindrical lens and the second optical element is a second cylindrical lens.

49. The wavelength-converted optical source of claim 39, wherein the first optical element includes a prism.

50. The wavelength-converted optical source of claim 39, wherein the second optical element includes a prism.

51. The wavelength-converted optical source of claim 39, wherein the first optical element includes a first prism and the second optical element includes a second prism.

52. The wavelength-converted optical source of claim 39, wherein the first optical element or the second optical element includes a prism and a spherical lens.

* * * * *